No. 831,448. PATENTED SEPT. 18, 1906.
B. LEINWEBER.
APPARATUS FOR HAULING LOOSE MATERIALS.
APPLICATION FILED OCT. 21, 1904.
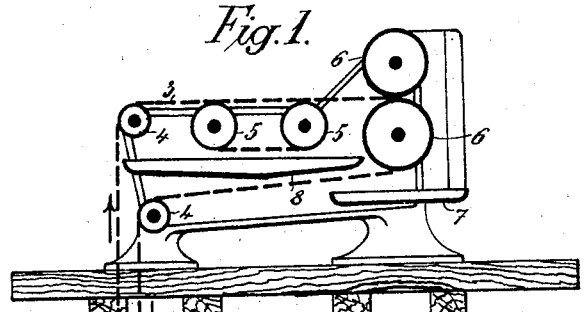
 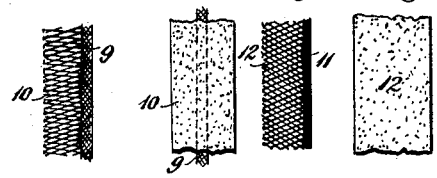
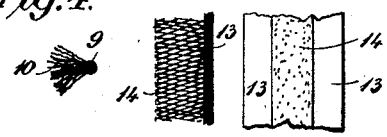
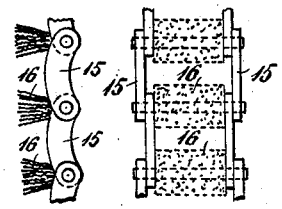 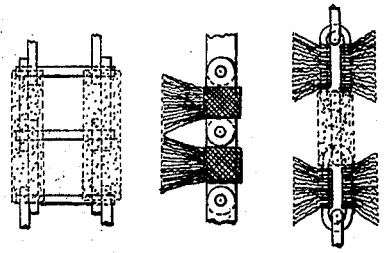
WITNESSES:
F. W. Wright
E. W. Collins
INVENTOR
Bruno Leinweber
BY
Howson and Howson
HIS ATTORNEYS.
THE NORRIS PETERS CO., WASHINGTON, D. C.

UNITED STATES PATENT OFFICE.

BRUNO LEINWEBER, OF VIENNA, AUSTRIA-HUNGARY.

APPARATUS FOR HAULING LOOSE MATERIALS.

No. 831,448.　　　　Specification of Letters Patent.　　　　Patented Sept. 18, 1906.

Application filed October 21, 1904. Serial No. 229,508.

*To all whom it may concern:*

Be it known that I, BRUNO LEINWEBER, engineer, a subject of the Emperor of Austria-Hungary, residing at Vienna, in the Empire of Austria-Hungary, have invented certain new and useful Improvements in Apparatus for Hauling Loose Materials; and I do hereby declare the following to be a full, clear, and exact description of the invention, such as will enable others skilled in the art to which it appertains to make and use the same.

My invention has for its object an improved apparatus for hauling loose—that is to say, liquid, pulpy, pasty, pulverulent, and granular—materials, particularly from deep pits, shafts, or wells.

My improved process consists in causing a flexible adhesive band or strip loosely depending into a pit or well, adapted to take up the material to be hauled by adhesion, to come first into contact with such material, and thus to take up some of it, and then causing the strip to carry the material taken up thereby to devices adapted to remove such material from the strip and to deposit the same in receptacles for further use.

I wish it to be understood that in the present specification and in the claims the word "adhesion" is used in its broadest physical meaning, comprising also surface attraction and capillary action.

In carrying out my invention I use a strip caused to run over suitable guide-rollers in such a manner that any given point of the working part of the strip first comes into contact with the material to be hauled and then carries the material taken up by it to devices for removing such material from the strip and thereupon is brought into contact with the material to be hauled again, and so on.

Preferably I use an endless strip or band caused to run continuously in the same direction over suitable guide-rollers, so that any portion of the same first takes up the material to be hauled, then carries it to the devices adapted to remove the material therefrom, and then runs to the material again, and so on, whereby the hauling is rendered continuous.

In the accompanying drawings I have shown, in Figure 1, by way of example, a diagrammatical side elevation of an apparatus for carrying out my invention, assuming that a liquid, such as crude petroleum, has to be hauled from the bottom of a pit or well. Figs. 2 to 13 show various constructional forms of bands or strips suitable for carrying into effect my invention.

1 is a pit or well. 2 is a liquid material, such as crude oil, at the bottom thereof that it is desired to haul.

3 is an endless band running over suitable guide-rollers 4.

5 indicates a driving-gear of any known or suitable construction for imparting continuous movement to the band in the direction of the arrows.

6 6 indicate a device for removing from the band the material taken up by the same at the bottom of the pit or well 1.

7 indicates a receptacle for collecting the material removed from the band by the device 6 6, and 8 indicates a receptacle for collecting any material removed from the band while this passes through the driving-gear.

Any given portion of the band 3 after having left the device 6 6 runs down the well 1 and comes into contact with the material 2 at the bottom thereof, (in the case of liquid or pulpy material, such as oil, preferably by dipping into the same,) taking up some of it by adhesion. The portion of the band thus charged with the material then ascends along the well and first passes through the driving-gear 5, (any of the material that may be removed therefrom under the action of the driving-gear being collected in the receptacle 8,) and then it passes through the device 6 6, which removes therefrom practically all of the material taken up thereby, such material being collected in the receptacle 7. After having left the device 6 6 the portion under consideration of the band returns to the pit or well, where it is charged again with material, and so on. Thus the hauling will be continuous.

The construction of the apparatus for carrying into practice the process above described may be varied within wide limits without departing from the essence of my invention, particularly the construction of the strip or band, and the construction of the device for removing the material from the strip or band may be varied according to the nature of the material to be hauled and according to the pit or well.

The strip or band consists in all cases of a backing of flexible material having the requisite tensile strength, such as a round or flat rope or ropes or a chain or chains provided with a coating capable of taking up by adhesion the material to be hauled. If liquid or pulpy materials have to be hauled, the said coating consists, preferably, of thickly-set long loose fibers or untwisted yarn or threads secured in any suitable or known manner to the backing, so as to form a sort of long-haired pile on the same, or it may consist of spongy material secured to the backing in any suitable way.

For hauling pasty, pulverulent, or granular material it will be sufficient to provide the backing with a roughened coating or with a comparatively short and stiff pile, and if pulverulent or granular material has to be hauled the backing may be provided simply with a sticky coating, such as of oil, tar, or the like. In most cases, and particularly in the case of flat strips or bands, I prefer to provide only one side of the backing with such coating— viz., that which does not come into contact with the guide-rollers—and in case of flat strips or bands the coating may extend over the whole width of the backing or over part only of the same, the latter being preferred in case of deep pits or wells.

In Figs. 2 to 13 I have shown, by way of example, some constructional forms of the strip or band suitable for carrying into practice my invention. Figs. 2, 3, and 4 show in side elevation, front elevation, and transverse section, respectively, a piece of a strip or band the backing of which consists of a round rope 9, while the coating 10 consists of a sort of long-haired pile at one side of the backing. Figs. 5 and 6 show in side elevation and front elevation, respectively, a piece of a strip or band having a backing 11, consisting of a flat rope and a coating 12, forming a sort of long-haired pile at one side of the backing, the coating extending over the entire width of the backing. Figs. 7 and 8 show in side elevation and front elevation, respectively, a similar strip or band having a backing 13, consisting of a flat rope, and a coating 14, forming a sort of long-haired pile. The coating, however, extends only over part of the width of the backing. Figs. 9 and 10 show in side elevation and front elevation a strip or band in which the backing consists of a so called "Gall chain" 15, while the coating consists of tufts of loose fibers, yarn, or threads secured to the bolts of the chain. Figs. 11 and 12 show in side elevation and front elevation a similar strip or chain which differs from that shown in Figs. 9 and 10 only by that the tufts forming the coating are secured to the side links of the chain. Fig. 13 shows in side elevation another constructional form of the strip or band, in which the backing consists of an ordinary chain, while the tufts forming the coating are secured to the sides of the links.

Instead of the long-haired pile or tufts of fibers, yarn, or threads shown in Figs. 2 to 13 spongy materials or a roughened coating or coatings covered with some sticky material— such as oil, tar, or the like—may be used.

The device for removing the material hauled from the strip or band may consist of one or more pairs of pressing-rollers, between which the strip or band is caused to pass, as indicated in the annexed drawings, if the material hauled is a liquid or pulpy one, or it may consist of one or more drawing-dies, doctors, brushes, blowing-jets, beaters, washing or dissolving baths, or any other suitable mechanism adapted to remove from the strip or band any liquid, pulpy, pasty, pulverulent, or granular material taken up thereby by adhesion.

The present invention is particularly designed for hauling or pumping material from deep wells or pits, and by using the same the great advantage is obtained that the diameter of the pits or wells may be much smaller than when bucket-chains or similar mechanisms or pumps heretofore employed for this purpose are used. The wells or pits with which the apparatus is especially adapted to be used are drilled in any well-known manner and often are two or three thousand feet deep and have a diameter of less than half a foot. Besides, any angles in the direction of the pit or well will not materially interfere with the hauling in accordance with the present invention, and, moreover, the entire machinery required for carrying into practice my invention is much simpler and cheaper than the hauling plants heretofore used.

I claim—

1. Apparatus for hauling loose material from a pit or well comprising an adhesive band loosely depending into the pit and means at the mouth of the pit for removing the adhering material.

2. Apparatus for hauling loose material from a pit or well comprising an adhesive band loosely depending into the pit, means at the mouth of the pit for removing the adhering material and means for collecting the removed material.

3. Apparatus for hauling loose material from a pit or well comprising an endless adhesive band having a loop loosely depending into the pit and passing out of the mouth of the pit, and means for removing the adhering material.

4. Apparatus for hauling loose material from a pit or well comprising an endless band having a brush-like surface, a loop of said band loosely depending into the pit, squeezing-rollers and troughs without the pit and means for leading said band between the squeezing-rollers for removing the adhering material.

5. Apparatus for hauling loose material from a pit or well comprising an endless adhesive band having a loop loosely depending into the pit, and means at the mouth of the pit for removing the adhering material, said means comprising a framework, guide-rollers from which the loop depends, means for driving said endless band, squeezing-rollers, and means between the driving means and squeezing-rollers for collecting the loose material.

6. Apparatus for hauling loose material from a pit or well comprising an endless band loosely depending into the pit, and means for removing the adhering material at the mouth of the pit, said band having a flexible backing, and a long-haired pile on one side of the backing.

In testimony whereof I have signed my name to this specification in the presence of two subscribing witnesses.

BRUNO LEINWEBER.

Witnesses:
T. G. HARDY,
ALVESTO S. HOGUE.